United States Patent
Cabrera et al.

(10) Patent No.: US 12,536,461 B1
(45) Date of Patent: Jan. 27, 2026

(54) SYSTEM AND METHOD USING QUANTUM BITS TO REDUCE LATENCY IN DATA TRANSMISSION

(71) Applicant: Bank of America Corporation, Charlotte, NC (US)

(72) Inventors: Freddy Alexis Cabrera, Matthews, NC (US); Manu Jacob Kurian, Dallas, TX (US); Swagata Banerjee, Thane West (IN)

(73) Assignee: Bank of America Corporation, Charlotte, NC (US)

( * ) Notice: Subject to any disclaimer, the term of this patent is extended or adjusted under 35 U.S.C. 154(b) by 28 days.

(21) Appl. No.: 18/777,141

(22) Filed: Jul. 18, 2024

(51) Int. Cl.
*G06N 10/40* (2022.01)
*H04L 41/14* (2022.01)
*H04L 69/22* (2022.01)

(52) U.S. Cl.
CPC ............. *G06N 10/40* (2022.01); *H04L 41/14* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 7,346,246 B2 | 3/2008 | Munro et al. | |
| 7,667,995 B1 | 2/2010 | Leuenberger et al. | |
| 7,889,992 B1 | 2/2011 | DiVincenzo et al. | |
| 8,903,094 B2* | 12/2014 | Bovino | H04L 9/0852 380/278 |
| 2004/0119061 A1 | 6/2004 | Wu et al. | |
| 2005/0254823 A1 | 11/2005 | Beausoleil et al. | |
| 2007/0215862 A1 | 9/2007 | Beausoleil et al. | |
| 2008/0212186 A1 | 9/2008 | Zoller et al. | |
| 2009/0097862 A1 | 4/2009 | Munro et al. | |
| 2009/0121215 A1 | 5/2009 | Choi | |
| 2010/0079833 A1 | 4/2010 | Langford et al. | |
| 2012/0093521 A1 | 4/2012 | Harrison et al. | |
| 2012/0155870 A1 | 6/2012 | Harrison et al. | |
| 2018/0241688 A1* | 8/2018 | Williams, Jr. | H04L 47/58 |
| 2019/0103962 A1* | 4/2019 | Howe | G06F 21/606 |
| 2019/0302107 A1 | 10/2019 | Kauffman et al. | |
| 2020/0374211 A1 | 11/2020 | Griffin et al. | |
| 2022/0131689 A1* | 4/2022 | Ito | H04L 9/0852 |
| 2022/0374760 A1* | 11/2022 | Chiani | H03M 13/611 |
| 2023/0361883 A1* | 11/2023 | Routt | G16Y 40/20 |
| 2023/0376817 A1 | 11/2023 | Bartlett et al. | |
| 2024/0070514 A1* | 2/2024 | Samuel | G06N 10/80 |

* cited by examiner

*Primary Examiner* — Mohamed Ibrahim

(57) ABSTRACT

A system for communicating information using quantum packets includes a memory configured to store data for transmission and a processor operably coupled to the memory. The processor divides the data for transmission into a first number of blocks. Each block is then encoded into a second number of quantum packets encoded as a plurality of quantum bits. Each of the second number of quantum packets includes at least one of the of the blocks and a mapping. The quantum packets are then transmitted through a quantum network to a second system for reconstruction. The second system utilizes the mapping included in each quantum packets to reassemble the data.

20 Claims, 2 Drawing Sheets

SYSTEM AND METHOD USING QUANTUM BITS TO REDUCE LATENCY IN DATA TRANSMISSION

TECHNICAL FIELD

The present disclosure relates generally to networked computing and, more specifically, to a system and method using quantum bits to reduce latency in data transmission.

BACKGROUND

Large organizations often utilize complex computing systems, such as data centers, to carry out day-to-day operations. These systems often include one or more networks to allow communication between components and/or entire data centers that may be geographically dispersed. As applications and data centers become more complex, the networks that support them are increasingly unable to provide enough bandwidth and/or speed to meet the expectations of the applications and components of the data centers.

SUMMARY

The system and method disclosed in the present application provide a technical solution to the technical problems discussed above by converting traditional packets into quantum packets for communicating between two devices. Quantum packets may carry more information than conventional packets due to the quantum bits (qubits) being able to hold more information than a conventional bit. In one or more embodiments, this extra space allows the quantum packet to carry a mapping for reassembling the information contained in the quantum packets, eliminating the need for transmitting separate mappings in the form of a header and/or footer. Further, this allows the quantum packets to be sent in any order since each quantum packet includes the mapping for reconstructing the information. This may result in reduced latency, faster transmission of data, and more efficient use of network resources.

In one embodiment, the disclosed system and method is for communicating information using quantum packets. The quantum packets comprise a plurality of qubits, allowing them to store more information than convention packets. The disclosed system includes a first quantum communication device and a second quantum communication device. The first and second quantum communication devices may be configured to communicate with one or more conventional computers that provide initial information and/or utilize the information communicated by the first and second quantum communication devices over a quantum network.

The first quantum communication device comprises a first memory configured to store data for transmission and a first processor operably coupled to the first memory. The first processor is configured to divide the data for transmission into a first number of blocks, and each of the first number of blocks has a predetermined size. The processor then encodes each of the blocks into a second number of quantum packets. The processor then transmits each of the second number of quantum packets through a quantum network to the second quantum communication device. The quantum packets comprise a plurality of quantum bits (qubits), and each of the quantum packets includes at least one of the blocks and a mapping; the mapping provides instructions for reassembling the data.

The second quantum communication device includes a second memory configured to store received data and a second processor operably coupled to the second memory. The second processor is configured to receive each of the second number of quantum packets from the quantum network. The second processor then decodes each of the received quantum packets into a plurality of received blocks and the mapping. The processor then produces reconstructed data using the plurality of received blocks and the mapping. The reconstructed data is reconstructed as each of the second number of quantum packets is received and stored in the second memory for future use and/or transmission to a conventional computer.

The disclosed system provides several practical applications, such as being able to transmit information at increased speed and in any order. This potentially allows more critical data to be received first and reconstructed before receiving all the information. This also allows for the reconstruction of the data even when not all quantum packets are successfully received; since those that are received include the mapping, potential missing information may be reconstructed. Further, since quantum packets are transmitted using quantum transportation, it is much easier to determine if the quantum packets have been tampered with, resulting in more secure communication of information while also having the previously mentioned benefits of improved speed and reliability. By utilizing the disclosed system and method, fewer computational resources and corresponding energy resources are needed to perform an application. These technical advantages improve the underlying computer and network systems by making them more secure, faster, and efficient.

Certain embodiments of the present disclosure may include some, all, or none of these advantages. These advantages and other features will be more clearly understood from the following drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System, Overview

Figure 1:
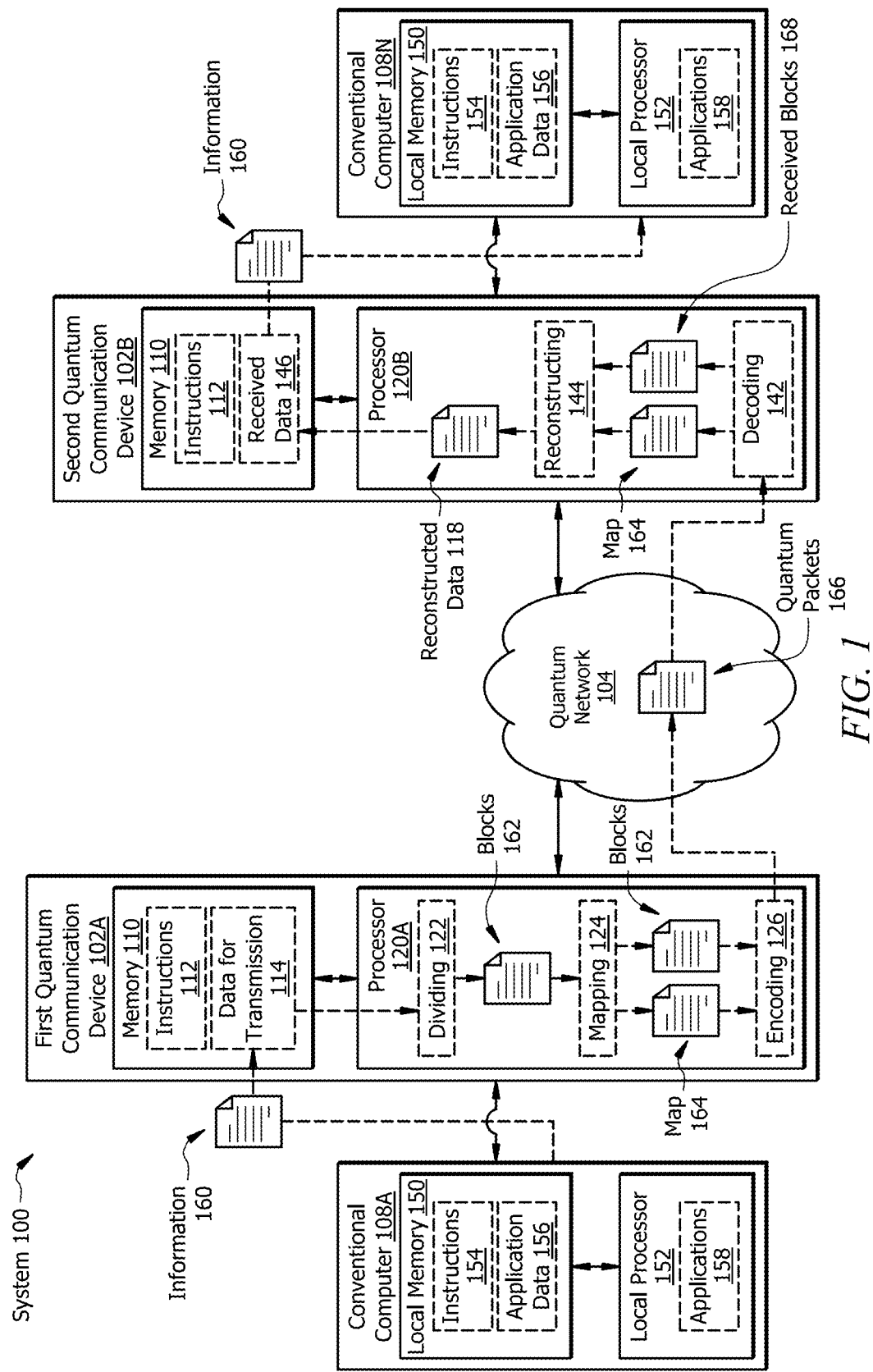
FIG. 1 illustrates one embodiment of a system configured for communicating information using quantum packets.

FIG. 1 is a schematic diagram of a system 100 configured for communicating information 160 over a quantum network 104. The system comprises a first quantum communication device 102A that takes conventional information 160, encodes it as quantum packets 166, and transmits the quantum packets 166 over the quantum network 104. A second quantum communication device 102B, receives the quantum packets 166 from the quantum network 104 and decodes them back into the information 160 for use by the second quantum communication device 102B, or a conventional computer 108N. As shown in FIG. 1, one or more conventional computers 108A-108N may optionally be provided. At least one conventional computer, e.g., 108A may provide the conventional information to the first quantum communication device 102A, while a different conventional computer, e.g., 108N may use the information 160 after it is received by a second quantum communication device 102B. The system 100 may be configured as shown or in any other suitable configuration.

Conventional Computers

Optional conventional computers 108A-108N may be any computational devices that may perform one or more applications 158 that either produce or use initial information 160. In one or more other embodiments, conventional computers 108A-108N may be part of the first and second quantum communication devices 102A and 102B or not included in system 100. The conventional computers 108A-108N may include any number of devices that perform one or more applications 158. Examples of a conventional computer, e.g., 108A, may include but are not limited to, computers, laptops, mobile devices (e.g., smartphones or tablets), servers, clients, automated teller machines (ATM), point of sale devices (POS), or any other suitable type of devices that may be used for accessing or supporting an application 158. While only two conventional computers, e.g., 108A and 108N, are shown, in one or more embodiments, a plurality of external devices, 108A-108N, may be present, each hosting an application 158 or a plurality of applications, e.g., 158. In one or more embodiments, the application 158 hosted by the conventional computer, e.g., 108A, may be a decentralized application and/or may take any other form and may be hosted by more than one conventional computer 108A-108N and/or quantum communication device 102A and 102B.

The conventional computer, e.g., 108A, includes at least one local processor 152 that performs one or more processes or operations, including performing the application 158 and sending and/or producing initial information 160 to a quantum communication device 102A-102N and/or an additional conventional computer, e.g., 108N. The local processor 152 executes instructions 154 stored in the local memory 150 to perform the application 158 as well as send and/or produce information 160. The application 158 may include web pages, database applications, banking applications, word processing applications, entertainment applications, video applications, and/or any other applications that an organization may have hosted by the conventional computers 108A-108N.

When executing the application 158, the local processor 152 may perform various operations. The local processor 152 may make API calls, perform batch jobs, modify application data 156 stored in local memory 150, and modify application data stored in other external devices (not shown). The local processor 152 may also perform one or more mathematical and logical operations, start and/or maintain active threads, and send and/or receive information 160 through the quantum network 104 to a second quantum communication device 102B and/or conventional computer 108N. The local processor 152 may perform other operations not listed above without departing from the disclosure; those listed are provided only as examples.

The conventional computer 108A may include a local memory 150 for storing instructions 154 that are for performing the application 158 and sending and/or producing information 160. The local memory 150 may also include application data 156 for the applications 158. In one or more embodiments, the local memory 150 may also store in the application data 156 the number and type of operations performed by the local processor 152 when performing the application 158.

The local memory 150 may be any type of storage for storing instructions 154 for executing by the local processor 152 as well as application data 156 used by and/or produced by the application 158. The local memory 150 may be a non-transitory computer-readable medium in operative communication with the local processor 152. The local memory 150 may be one or more disks, tape drives, or solid-state drives. Alternatively, or in addition, the local memory 150 may be one or more cloud storage devices. The local memory 150 may be volatile or non-volatile. It may comprise read-only memory (ROM), random-access memory (RAM), ternary content-addressable memory (TCAM), dynamic random-access memory (DRAM), and static random-access memory (SRAM).

While FIG. 1 shows the conventional computers 108A-108N, including only a single local processor 152 and a local memory 150, they may include any suitable number and combination of processors, e.g., 152 and memories 150, as well as any other necessary components. For simplicity, only one local processor, e.g., 152, and one local memory, e.g., 150, are shown in FIG. 1.

Quantum Network

The quantum network 104 may be any suitable type of wireless and/or wired network that is able to transmit and/or send quantum packets 166. The quantum network 104 may utilize quantum teleportation and/or other quantum-based communications technologies in one or more embodiments. However, the quantum network 104 may take any form including, but not limited to, all or a portion of the Internet, an intranet, a private network, a public network, a peer-to-peer network, a public switched telephone network, a cellular network, a local area network (LAN), a metropolitan area network (MAN), a wide area network (WAN), and a satellite network and/or any other methods of communication that are capable of communicating quantum packets 166. The quantum network 104 may be configured to support any suitable type of communication protocol as would be appreciated by one of ordinary skill in the art.

The quantum network 104 may connect the first and second quantum communication devices 102A and 102B and/or one or more conventional computers 108A-108N. In one or more embodiments, different elements of system 100 may be at different geographic locations and connected through at least the quantum network 104. While shown as a single network, e.g., 104, the quantum network 104 may comprise a plurality of components of any suitable networking equipment, including but not limited to routers and switches, that allow at least the first quantum communication device 102A to communicate with the second quantum communication device 102B. Further, while only a quantum network 104 is shown, a non-quantum or conventional network may also be present that connects the conventional computers 108A-108N and/or the quantum communication devices 102A and 102B with each other and/or computing devices outside system 100. Quantum network 104 is not limited to the configuration shown in FIG. 1, which is simply shown in this form for simplicity and explanatory purposes.

In one or more embodiments, the Quantum network 104 utilizes quantum entanglement and/or quantum teleportation to communicate the quantum packets 166 between the first quantum communication device 102A and the second quantum communication device 102B. Quantum teleportation is a technique for transferring quantum information from a sender at one location to a receiver some distance away. Quantum teleportation transfers information using a qubit, which, unlike the classical bit, which is either a 0 or a 1, the qubit may be, in addition, both 0 and 1, or a superposition of 0 and 1, allowing the communication medium to include additional information compared to the classical information, accordingly a quantum packet made up of a plurality of qubits has the ability to encode much more information than a classical packet made up of only classical bits.

When using quantum teleportation, an entangled quantum state is created for the qubits making up the quantum packets 166 to be transferred. Entanglement imposes statistical correlations between otherwise distinct physical systems by creating or placing two more separate particles into a single shared quantum state. This intermediate state contains two particles whose quantum states are related: measuring one particle's state provides information about the measurement of the other particle's state. The sender, e.g., quantum communication device 102A, will combine the particle of which the information is teleported with one of the entangled particles, causing a change in the overall entangled quantum state. The particles in the receiver, e.g., the second quantum communication device 102B, are analyzed, which determines the change of the entangled state. The changed measurement may allow the receiver, e.g., the second quantum communication device 102B, to recreate the original information that had been sent, resulting in the information being teleported or carried between two communication devices that are at different locations. Since the original information is "destroyed" when reading it, this makes it difficult, if not impossible, for a nefarious actor in the quantum network 104 to read and/or modify the quantum packets 166, providing a secure and efficient means of communicating the information 160 encoded in the quantum packets 166.

Quantum Communication Device, Overview

FIG. 1 shows a schematic diagram of quantum communication devices 102A and 102B. Quantum communication devices 102A and 102B are configured to communicate information 160 over a quantum network 104. The first quantum communication device, 102A, performs encoding 126 to encode information 160 into quantum packets 166, which are received by the second quantum communication device 102B, which performs decoding 142 and reconstructing 144 to recover the information 160. In one or more embodiments, the quantum communication devices 102A and 102B comprise a memory 110 and a processor, e.g., 120A. While only one memory 110 and one processor, e.g., 120A, are shown, additional memories, e.g., 110, and processors, e.g., 120B, may be present without departing from the disclosure.

The quantum communication devices 102A and 102B in one or more embodiments may take the form of and/or include a quantum computer. Alternatively, or in addition, the conventional computer 108A-108N may instead be quantum computers. A quantum computer is a computer that utilizes quantum mechanical phenomena. A quantum computer uses qubits to perform calculations efficiently and quickly. A quantum computing system includes a quantum processor, e.g., 120A. It may additionally include other processors for converting information into qubits in the manner that will be described below concerning the quantum communication devices 102A and 102B. The quantum processor, e.g., 120A, may take the form of any of: a superconducting quantum device where qubits are implemented by states of Josephson junctions, a trapped ion device where qubits are implemented by the internal state of trapped ions, a trapped neutral atom device where qubits are implemented by the internal states of trapped neutral atoms, a photon-based device where qubits are implemented by the modes of photons or any other suitable device that implements qubits with states of a respective quantum system. The disclosure is not limited to a quantum computer, and quantum communication devices 102A and 102B may utilize conventional memories 110 and processors 120A and 120B without communicating with or using a quantum computer.

Memory

Memory 110 may be any type of storage for storing a computer program comprising instructions 112, data for transmission 114, and any other data that the quantum communication devices 102A. The memory 110 may be a non-transitory computer-readable medium in operative communication with the processor, e.g., 120A. The memory 110 may be one or more disks, tape drives, or solid-state drives. Alternatively, or in addition, the memory 110 may be one or more cloud storage devices. The memory 110 may be volatile or non-volatile. It may comprise read-only memory (ROM), random-access memory (RAM), ternary content-addressable memory (TCAM), dynamic random-access memory (DRAM), and static random-access memory (SRAM).

The memory 110 stores instructions 112, which, when executed by the processor, e.g., 120A, causes the processor, e.g., 120A, to perform the operations shown in FIG. 2 described below. Instructions 112 may comprise any suitable set of instructions, logic, rules, or code.

Memory 110 may include storage that may take the form of a database for storing things, such as data for transmission 114. These may be stored and recalled using known protocols such as SQL, XML, and/or any other protocol or language that a user, administrator, or developer of the system 100 wishes to use. The instructions 112, data for transmission 114, and any other data or information stored in memory 110 may be stored in different forms, and the disclosure is not limited to storing the instructions 112 and data for transmission 114 as a database.

The memory 110 in one or more embodiments stores data for transmission 114 and/or received data 146. The data for transmission 114 comprises the data making up the information 160 that is initially received, and the received data 146 comprises the data received after the data for transmission is sent through the quantum network 104. In one or more embodiments, the data for transmission 114 and the received data 146 are in the form of conventional data or conventional packets. The data for transmission 114, received data 146, and/or information 160 may comprise any data the conventional computer, e.g., 108A, needs to communicate to a second conventional computer, e.g., 108N. As described above, the information 160 and data for transmission 114 may have been produced by applications 158 produced by the local processor 152. The data for transmission 114 is used by processor 120A to produce quantum packets 166, and those quantum packets are decoded by processor 120B of the second quantum communication device 102B, which reconstructs the information and may store it in memory 110 as received data 146.

Processor

The processors 120A and 120B may take the form of any electronic circuitry including, but not limited to, a quantum processor as described above, state machines, one or more central processing unit (CPU) chips, logic units, cores (e.g., a multi-core processor), field-programmable gate array (FPGAs), application specific integrated circuits (ASICs), or digital signal processors (DSPs). The processors 120A and 120B may be a programmable logic device, a microcontroller, a microprocessor, or any suitable combination of the preceding. Each processor, e.g., 120A, is communicatively coupled to and in signal communication with a memory 110. The one or more processors making up a processor, e.g., 120A, are configured to process data and may be implemented in hardware or software. For example, the processor, e.g., 120A, may be 8-bit, 16-bit, 32-bit, 64-bit, or of any other suitable architecture. The processor, e.g., 120A, may include an arithmetic logic unit (ALU) for performing arithmetic and logic operations; processor registers that supply operands to the ALU and store the results of ALU operations, and a control unit that fetches instructions 112 from memory 110 and executes them by directing the coordinated operations of the ALU, registers and other components. The processor, e.g., 120A, may additionally or instead comprise a quantum processor and/or quantum computer as described above.

The processors 120A and 120B are in operative communication with memory 110 and are configured to implement various instructions 112 stored in memory 110. The processors 120A and 120B may be a special-purpose computer designed to implement the instructions 112 and/or functions disclosed herein. For example, the processors 120A and 120B may be configured to perform operations, including those described below and shown in FIG. 2. A first processor 120A may perform dividing 122, mapping 124, and encoding 126 when sending quantum packets 166 through the quantum network 104. When receiving quantum packets 166 from the quantum network 104, a second processor 120B may perform decoding 142 and reconstructing 144.

The first processor 120A, in one or more embodiments, retrieves the data for transmission 114 from memory 110 or directly from a conventional computer, e.g., 108A. When the first processor 120A receives the data for transmission 114, it performs dividing 122, which divides the data for transmission 114 into a plurality of blocks 162. These blocks 162 may be divided into blocks with a predetermined or variable size. The blocks 162 have any size that is less than the size of a quantum packet 166. The blocks 162 may be the same size as those used in non-quantum networks or may be larger due to the increased amount of data that a qubit/quantum packet can hold. The blocks 162 may be a size such that two or more blocks 162 may fit in a single quantum packet 166. The blocks 162 may be any size that is useful for transmitting the information 160 over the quantum network 104, and the disclosure is not limited to a particular size.

Simultaneously or after, the data for transmission 114 is divided into blocks 162 by the first processor 120A; the first processor 120A performs mapping 124. When performing mapping 124, the first processor 120A determines a map 164 detailing how each of the blocks 162 is related to each other of the blocks 162. This may also include determining a particular order in which each of the blocks 162 should be transmitted where some blocks 162 are more important than others; for example, in a non-limiting example, when transmitting a video, the bocks 162 that represent a static background are less important than those for moving components of a video.

Once the first processor 120A divides the data for transmission 114 into blocks by performing dividing 122 and maps the blocks 162 by mapping 124 the blocks 162 to produce a map 164, the first processor 120A encodes the map 164 and the blocks 162 by performing encoding 126, which encodes the mapping 164 and blocks 162 into quantum packets 166 for transmission through the quantum network 104 described above. Since the qubits making up the quantum packets 166 allow each quantum packet 166 to carry more information/data, in one or more embodiments, the first processor 120A, when performing encoding 126, encodes the map 164 along with one or more blocks 162 into each of the quantum packets 166 instead of a separate header and footer. By encoding the map 164 into each of the quantum packets 166, no separate header or footer packet needs to be transmitted across the quantum network 104. Further, since each quantum packet 166 includes map 164, the reconstructed data 118 and, ultimately, information 160 may be reconstructed even when less than all of the blocks/quantum packets 166 have been received. This allows for increased efficiency.

In one or more embodiments, the first processor 120A, when performing encoding 126, utilizes one or more quantum data encoding schemes. For example, in one or more embodiments, the first processor 120A, when performing encoding 126, may perform computational basis encoding where classical bits are directly mapped to qubits using computational basis states. In a second example, the first processor 120A may perform superposition encoding by placing qubits in a superposition of classical states, allowing for encoding multiple classical states simultaneously. In a third example, the first processor 120A may perform angle encoding where classical information is encoded in the relative phase between different quantum states. In yet another example, the first processor 120A may perform amplitude encoding where classical information is encoded in the amplitudes of quantum states; by adjusting the probability amplitudes of different states, information may be represented in a quantum superposition. Other quantum data encoding schemes may be used by the first processor 120A when encoding 126 information 160 as quantum packets 166, and those just listed are merely exemplary, and the disclosure is not limited to those listed. Any of the methods of encoding 126 the information 160 as quantum packets 166 may be used. Each has advantages and disadvantages, and the specific method used may be selected by a user, administrator, developer, manufacturer, or other concerned party based on the particular application of the system 100 and/or the specific type of information 160 being transmitted between quantum communication device 102A and second quantum communication device 102B.

Once the data is encoded by the first processor 120A, performing encoding 126, the data is transmitted as quantum packets 166 through the quantum network 104 to the second quantum communication device 102B. The second quantum communication device, 102B, has the same structure as the first quantum communication device 102A, including memory 110, which stores instructions 112 and received data 146. The second quantum communication device, 102B, also includes a second processor 120B. When receiving quantum packets 166, the second processor 120B of the second quantum communication device 102B performs a decoding 142 and reconstructing 144.

The second processor 120B, when performing decoding 142, receives the quantum packet 166, extracts the map 164, and receives blocks 168. In one or more embodiments, the second processor 120B, when decoding 142, performs the same process in reverse as encoding 126. However, the second processor 120B may perform any process that is able to extract map 164 and received blocks 168 from quantum packets 166, and it is not restricted to just the reverse of the process used for encoding 126 quantum packets 166.

Using the map 164, the second processor 120B then performs reconstructing 144 to produce reconstructed data 118. The second processor 120B may produce reconstructed data 118 by reconstructing 144 all at once, once all of the quantum packets 166 are received, or the second processor 120B may perform reconstructing 144 as each of the quantum packets 166 are received using map 164 encoded in each of the quantum packets 166 to produce at least part of the reconstructed data 118. The second processor 120B may reconstruct the information 160 by reassembling the data included in each of the blocks 168 that have been received. Once the reconstructed data 118 is produced in whole or in part by the second processor 120B performing reconstructing 144, the reconstructed data 118 may be stored in memory 110 as received data 146 and/or packaged as one or more conventional packets and sent to a conventional computer, e.g., 108N, as information 160 for further processing or other purposes. The received data 146 may be the same as the data for transmission 114 or may include more or less data.

Optionally or in addition, in one or more embodiments, the second processor 120B, when producing reconstructed data 118, may analyze each packet to determine if the quantum packets 166 have been tampered with. Since each quantum packet 166 in one or more embodiments includes a map 164, any deviation in the map 164 or the content of the received blocks 168 from what is expected based on map 164 from one quantum packet 166 to the next may indicate tampering. Alternatively, suppose a large amount of the quantum packets 166 do not arrive or are corrupted. This would also suggest that the quantum packets 166 may have been intercepted or tampered with due to the specifics of how a quantum network 104, using, for example, quantum teleportation, functions.

Each of the processors 120A and 120B of the quantum communication devices 102A and 102B may perform more or less operations than described, as will be described below regarding FIG. 2. The operations may be performed in any order. They may be performed by other components such as the quantum network 104 and/or conventional computers 108A-108N. The disclosure is not limited to what has been described above; the specific operations are only examples.

Process for Using Quantum Bits to Reduce Latency in Data Transmission

Figure 2:
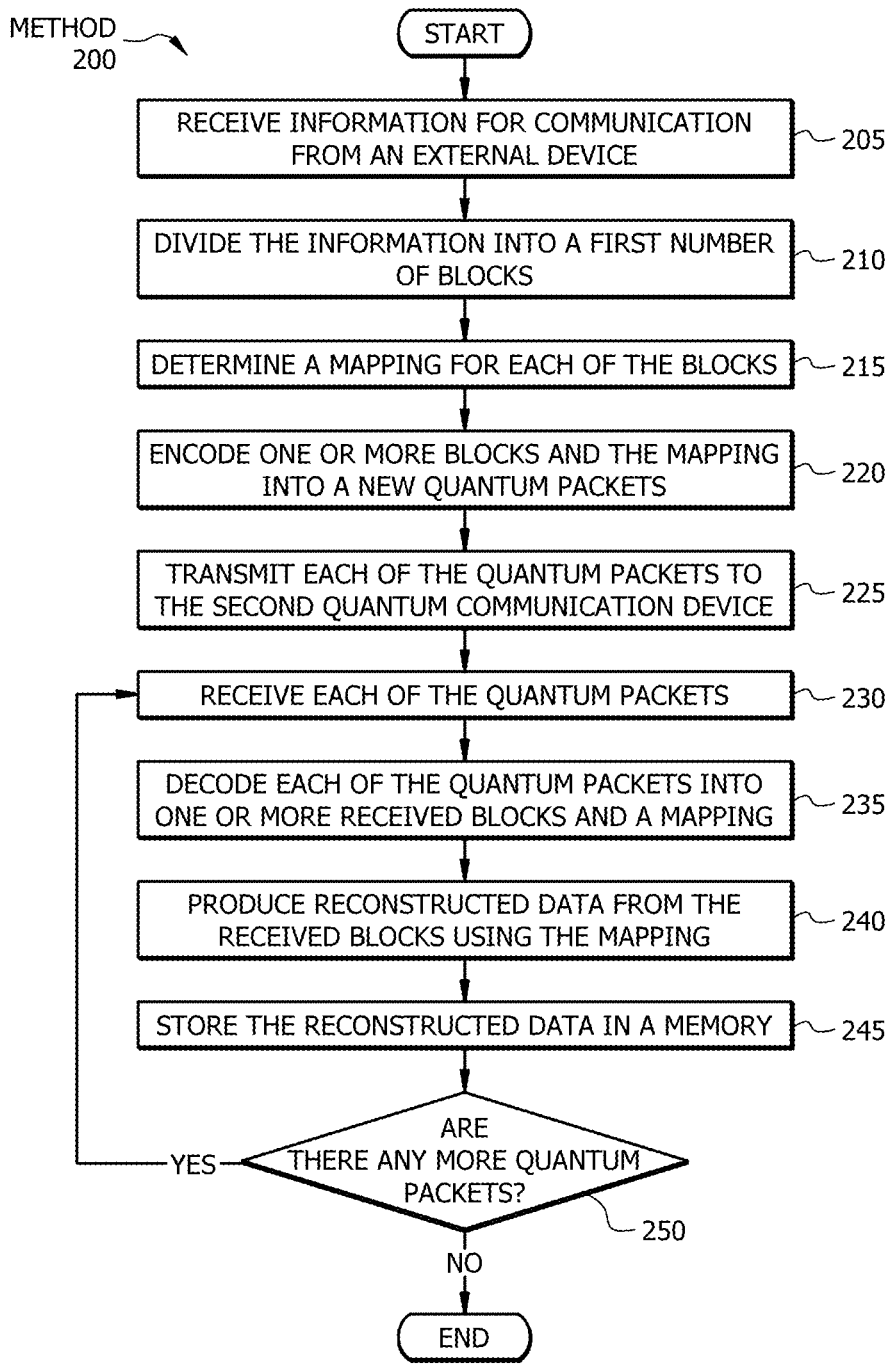
FIG. 2 illustrates one embodiment of a flowchart for using quantum bits to reduce latency in data transmission.

FIG. 2 is a flowchart of an embodiment of method 200 performed by first and second processors 120A and 120B for receiving information and transmitting it by a quantum communication device 102A using qubits over a quantum network 104 to a second quantum communication device 102B. The processors 120A and 120B may execute instructions 112 stored in the memory 110, which employs method 200 for using quantum bits to reduce latency in data transmission.

Method 200 begins at operation 205 when the first processor 120A receives initial information 160 from a conventional computer 108A. The information 160 may take the form of any information 160 or data that needs to be transmitted from a conventional computer, e.g., 108A and/or the quantum communication device 102A, to a second quantum computation device 102B and/or another conventional computer, e.g., 108N. The information 160 may be video, communications, one or more transactions, signaling between devices, performing processes, telemetry, and/or any other types of information that need to be transmitted.

Once the information is received, the first processor 120A divides the information into the first number of blocks, 162, in operation 210. The blocks 162 may be divided into blocks 162 having a predetermined size and/or number of qubits and/or bits. Alternatively, the blocks 162 may have a variable size. These blocks 162 may have any size that is less than the size of a quantum packet 166. Each of the quantum packets 166 may hold more than one of the blocks 162, and the number of blocks 162 in one or more embodiments may be greater than the number of quantum packets 166. The blocks 162 may be the same size as those used in non-quantum networks or may be larger due to the increased amount of data that a qubit/quantum packet 166 can hold. The blocks 162 may be a size such that two or more blocks 162 may fit in a single quantum packet 166. The blocks 162 may be any size that is useful for transmitting the information 160 over the quantum network 104, and the disclosure is not limited to a particular size.

At the same time or after the first processor 120A performs operation 210, the first processor 120A determines a map 164 for each of the blocks 162 in operation 215. When performing mapping 124, the first processor 120A determines a map 164 detailing how each of the blocks 162 is related to each other of the blocks 162. This may also include determining a particular order in which each of the blocks 162 should be transmitted where some blocks 162 are more important than others; for example, in a non-limiting example, when transmitting a video, the bocks 162 that represent a static background are less important than those for moving components of a video.

Once map 164 is produced in operation 215, method 200 proceeds to operation 220. In operation 220, the first processor 120A encodes one or more blocks 162 and the map 164, into each of the new quantum packets 166. Since the qubits making up the quantum packets 166 allow each of the quantum packets 166 to carry more information/data, in one or more embodiments, the first processor 120A, when performing encoding 126, encodes the map 164 along with one or more blocks 162 into each of the quantum packets 166. By encoding the map 164 into each of the quantum packets 166, no separate header or footer packet needs to be transmitted across the quantum network 104. Further, since each of the quantum packets 166 includes a map 164, the received data 146 and, ultimately, information 160 may be reconstructed even when less than all of the blocks/quantum packets 166 have been received. In one or more embodiments, the first processor 120A, when performing operation 220, utilizes one or more known quantum data encoding schemes such as, but not limited to, computational basis encoding, superposition encoding, angle encoding, and amplitude encoding.

Once the blocks 162 and map 164 are encoded into new quantum packets 166 in operation 220, the first processor 120A transmits each of the quantum packets 166 to the second quantum communication device 102B in operation 225. In one or more embodiments, the quantum packets 166 are transmitted over a quantum network 104. Alternatively, or in addition, in one or more embodiments, the first processor 120A could cause some or all of the quantum packets 166 to be transmitted across a non-quantum or conventional network (not shown). The quantum network 104 may use quantum entanglement and/or quantum transportation to transmit the quantum packets 166 across a distance that separates the first quantum communication device 102A and the second quantum communication device 102B.

Once at least one quantum packet 166 is transmitted across the quantum network 104 or another network (not shown) in operation 225, each quantum packet 166 is received by the second quantum communication device 102B and its processor, e.g., the second processor 120B. The second processor 120B receives each of the quantum packets 166 in operation 230. Either as each of the quantum packets 166 are received or as each of the quantum packets 166 is received, the second processor 120B decodes each of the quantum packets 166 into one more received blocks 168 and a map 164 in operation 235.

These received blocks 168 may be identical to blocks 162, or they may include more or less information/data depending on the nature of the quantum network 104 as well as how the first processor 120A in operation 220 encoded the quantum packets 166. In one or more embodiments, an identical map 164 is received with each of the quantum packets 166. However, the disclosure is not limited to receiving an identical map 164, and one or all of the quantum packets 166 may include a partial or different map so that, for example, a bad actor cannot reconstruct the data from less than all of the quantum packets 166.

Using the map 164, the second processor 120B then produces reconstructed data 118 in operation 240, and this reconstructed data 118 is stored in the memory 110 as received data 146 in operation 245. At the same time or after completing operations 240 and 245, the second processor 120B determines if there are any more quantum packets in operation 250. If there are additional quantum packets 166, the second processor 120B repeats operations 230-250 until there are no other quantum packets. Once there are no other quantum packets 166 in operation 250, the method 200 of FIG. 2 ends.

The present examples are to be considered illustrative and not restrictive, and the intention is not to be limited to the details given herein. For example, the various elements or components may be combined or integrated into another system, or certain features may be omitted or not implemented.

While several embodiments have been provided in the present disclosure, it should be understood that the disclosed systems and methods might be embodied in many other specific forms without departing from the spirit or scope of the present disclosure. The present examples are to be considered illustrative and not restrictive, and the intention is not to be limited to the details given herein. For example, the various elements or components may be combined or integrated into another system, or certain features may be omitted or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

To aid the Patent Office and any readers of any patent issued on this application in interpreting the claims appended hereto, applicants note that they do not intend any of the appended claims to invoke 35 U.S.C. § 140 (f) as it exists on the date of filing hereof unless the words "means for" or "operation for" are explicitly used in the particular claim.

The invention claimed is:

1. A system for communicating, comprising:
 a first quantum communication device comprising:
  a first memory configured to store data for transmission; and
  a first processor operably coupled to the first memory and configured to:
   divide the data for transmission into a first number of blocks, wherein each of the first number of blocks has a predetermined size;
   encode each of the first number of blocks into a second number of quantum packets encoded as a plurality of quantum bits (qubits), wherein each of the second number of quantum packets includes at least one of the first number of blocks and a mapping; and
   transmit through a quantum network to a second quantum communication device, each of the second number of quantum packets, wherein the mapping provides instructions for reassembling the data; and
 a second quantum communication device comprising:
  a second memory configured to store received data; and
  a second processor operably coupled to the second memory and configured to:
   receive from the quantum network each of the second number of quantum packets;
   decode each of the second number of quantum packets into a plurality of received blocks and the mapping;
   produce reconstructed data using the plurality of received blocks and the mapping, wherein the reconstructed data is reconstructed as each of the second number of quantum packets is received; and
   store the reconstructed data in the second memory.

2. The system of claim 1, wherein prior to dividing the data for transmission into a first number of blocks, the first processor is configured to:
 receive from an external device a third number of packets communicating initial information, wherein the third number of packets comprises a header and the initial information and wherein the third number of packets are conventional packets; and
 store the initial information communicated by the third number of packets in the first memory as the data for transmission.

3. The system of claim 2, wherein the first processor is further configured to produce the mapping using at least the header included in the third number of packets.

4. The system of claim 1, wherein the second processor is further configured to:
 package the reconstructed data as a plurality of conventional packets; and
 send the plurality of conventional packets to an external device.

5. The system of claim 1, wherein the first number of blocks is greater than the second number of quantum packets.

6. The system of claim 1, wherein the quantum network utilizes quantum entanglement to transmit each of the second number of quantum packets to the second quantum communication device.

7. The system of claim 1, wherein the second number of quantum packets are not transmitted to the second quantum communication device in a predetermined order.

8. The system of claim 1, wherein the second processor determines if each of the second number of quantum packets has been tampered with by at least comparing the mapping with content of each of the first number of blocks encoded in each of the second number of quantum packets.

9. A method for communicating:
 receiving by a first quantum communication device data for transmission;
 dividing the data for transmission into a first number of blocks, wherein each of the first number of blocks has a predetermined size;

encoding each of the first number of blocks into a second number of quantum packets encoded as a plurality of quantum bits (qubits), wherein each of the second number of quantum packets includes at least one of the first number of blocks and a mapping;

transmitting through a quantum network to a second quantum communication device, each of the second number of quantum packets, wherein the mapping provides instructions for reassembling the data for transmission by the second quantum communication device;

receiving by the second quantum communication device each of the second number of quantum packets;

decoding each of the second number of quantum packets into a plurality of received blocks and the mapping;

producing reconstructed data using the plurality of received blocks and the mapping, wherein the reconstructed data is reconstructed as each of the second number of quantum packets is received; and storing the reconstructed data in a memory.

10. The method of claim 9, further comprising:

prior to dividing the data for transmission into a first number of blocks, receiving from an external device a third number of packets communicating initial information, wherein the third number of packets includes a header and wherein the third number of packets are conventional packets; and store the initial information communicated by the third number of packets in a second memory as the data for transmission.

11. The method of claim 10, wherein the mapping is produced using at least the header included in the third number of packets.

12. The method of claim 9, further comprising:

packaging the reconstructed data as a plurality of conventional packets; and sending the plurality of conventional packets to an external device.

13. The method of claim 9, wherein the first number of blocks is greater than the second number of quantum packets.

14. The method of claim 9, wherein the quantum network utilizes quantum entanglement to transmit each of the second number of quantum packets to the second quantum communication device.

15. The method of claim 9, wherein the second number of quantum packets are not transmitted to the second quantum communication device in a predetermined order.

16. A non-transitory computer-readable medium storing instructions that, when executed by a processor, cause the processor to:

receive by a first quantum communication device data for transmission;

divide the data for transmission into a first number of blocks, wherein each of the first number of blocks has a predetermined size;

encode each of the first number of blocks into a second number of quantum packets encoded as a plurality of quantum bits (qubits), wherein each of the second number of quantum packets includes at least one of the first number of blocks and a mapping;

transmit through a quantum network to a second quantum communication device, each of the second number of quantum packets, wherein the mapping provides instructions for reassembling the data for transmission by the second quantum communication device;

receive by the second quantum communication device each of the second number of quantum packets;

decode each of the second number of quantum packets into a plurality of received blocks and the mapping;

produce reconstructed data using the plurality of received blocks and the mapping, wherein the reconstructed data is reconstructed as each of the second number of quantum packets is received; and store the reconstructed data in a memory.

17. The non-transitory computer-readable medium of claim 16, wherein the instructions further cause the processor to:

prior to dividing the data for transmission into a first number of blocks, receive from an external device a third number of packets communicating initial information, wherein the third number of packets comprises a header and the initial information and wherein the third number of packets are conventional packets; and store the initial information communicated by the third number of packets in a second memory as the data for transmission.

18. The non-transitory computer-readable medium of claim 17, wherein the mapping is produced using at least the header included in the third number of packets.

19. The non-transitory computer-readable medium of claim 16, wherein the instructions further cause the processor to:

package the reconstructed data as a plurality of conventional packets; and send the plurality of conventional packets to an external device using a conventional network.

20. The non-transitory computer-readable medium of claim 16, wherein the second number of quantum packets are not transmitted to the second quantum communication device in a predetermined order.

* * * * *